(12) United States Patent
Kobayashi et al.

(10) Patent No.: US 8,142,249 B2
(45) Date of Patent: Mar. 27, 2012

(54) MANUFACTURING METHOD OF DISPLAY DEVICE

(75) Inventors: Setsuo Kobayashi, Mobara (JP); Hiroaki Miwa, Yokohama (JP); Katsuhiko Ishii, Chosei (JP); Shuji Iwasaki, Chosei (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 838 days.

(21) Appl. No.: 11/962,172

(22) Filed: Dec. 21, 2007

(65) Prior Publication Data
US 2008/0153377 A1    Jun. 26, 2008

(30) Foreign Application Priority Data
Dec. 25, 2006    (JP) .................................. 2006-346932

(51) Int. Cl.
B32B 37/12    (2006.01)
(52) U.S. Cl. .................... 445/24; 156/273.5; 156/273.7; 156/285
(58) Field of Classification Search ............... 445/23–25; 257/99–100; 427/532–535; 428/34; 349/122, 349/187; 345/87; 156/273.3, 273.7, 275.1, 156/275.5, 275.7, 277, 290, 291, 292, 285, 156/286; 313/498–512
See application file for complete search history.

(56) References Cited

U.S. PATENT DOCUMENTS

| | | | |
|---|---|---|---|
| 7,120,011 B2 | 10/2006 | Takahashi et al. | |
| 7,492,081 B2 * | 2/2009 | Hori et al. | 313/112 |
| 7,806,744 B2 | 10/2010 | Ota et al. | |
| 2002/0025441 A1 * | 2/2002 | Hieda et al. | 428/440 |
| 2004/0159391 A1 * | 8/2004 | Yamaguchi et al. | 156/106 |
| 2005/0046622 A1 * | 3/2005 | Nakanishi et al. | 345/173 |
| 2005/0224156 A1 * | 10/2005 | Miyazawa | 156/73.6 |
| 2006/0054274 A1 * | 3/2006 | Tsai et al. | 156/285 |
| 2009/0267076 A1 * | 10/2009 | Yamazaki et al. | 257/72 |

FOREIGN PATENT DOCUMENTS

| | | |
|---|---|---|
| CN | 1648731 | 8/2005 |
| JP | H03-148632 | 6/1991 |
| JP | 10-254380 | 9/1998 |
| JP | 2003-255390 | 9/2003 |
| JP | 2004-069822 B | 3/2004 |
| JP | 2004-226880 A | 8/2004 |
| JP | 2005-243413 | 9/2005 |
| JP | 2005-275239 | 10/2005 |
| JP | 2006-36865 | 2/2006 |
| JP | 2006-036865 | 2/2006 |

* cited by examiner

*Primary Examiner* — Joseph L Williams
*Assistant Examiner* — Fatima Farokhrooz
(74) *Attorney, Agent, or Firm* — Antonelli, Terry, Stout & Kraus, LLP.

(57) ABSTRACT

To prevent bubbles from remaining when a transparent substrate is bonded via an adhesive with a display panel. A manufacturing method of a display device in which a transparent substrate is bonded with a display panel via an adhesive, including a coating step of coating the adhesive onto the display panel or the transparent substrate in a predetermined pattern, a bonding step of bonding the display panel and the transparent substrate via the adhesive after the coating step, and a curing step of curing the adhesive after the bonding step, characterized in that the adhesive has a viscosity of 2000 to 5000 mPa·s at the coating step, the display panel and the transparent substrate are bonded via the adhesive in a reduced pressure atmosphere lower than the atmospheric pressure in a state where the adhesive coated at the coating step is spread and the size of bubble is 1 mm or less at maximum at the bonding step, and the adhesive is cured by applying ultraviolet ray at the curing step.

23 Claims, 5 Drawing Sheets

MANUFACTURING METHOD OF DISPLAY DEVICE

The present application claims priority from Japanese application JP2006-346932 filed on Dec. 25, 2006, the content of which is hereby incorporated by reference into this application.

BACKGROUND OF THE INVENTION

1. Field of the Invention

The present invention relates to a manufacturing method of a display device, and more particularly to a manufacturing method of a display device in which a transparent substrate (protection cover) is bonded with a display panel via an adhesive.

2. Description of Related Art

A display device such as a liquid crystal display is used in various sizes ranging from small portable telephones to large TV.

FIG. 11 is a cross-sectional view for explaining the conventional liquid crystal display. In FIG. 11, a display panel PNL such as a liquid crystal display panel, for example, is incorporated into a casing CAS for the portable telephone.

In the liquid crystal display panel, the display panel PNL has a substrate SUB1, a substrate SUB2, a sealing material SL for bonding the substrate SUB1 and the substrate SUB2, a liquid crystal LC sealed into the inside surrounded by the substrate SUB1, the substrate SUB2 and the sealing material SL, a polarizer POLL disposed on the side of the substrate SUB1 opposite to the liquid crystal LC, and a polarizer POL2 disposed on the side of the substrate SUB2 opposite to the liquid crystal LC, for example.

The display panel PNL is disposed to overlap an opening portion provided in the casing CAS. In the opening portion of the casing CAS, a transparent substrate (protection cover) COV made of glass or acrylic (PMMA), for example, is bonded by a double-faced tape TAP or the like. And there was a space SP with an air layer interposed between the display panel PNL and the transparent substrate COV in the liquid crystal display as shown in FIG. 11.

Besides the liquid crystal display as shown in FIG. 11, there is the liquid crystal display in which the transparent substrate such as a reinforcing substrate is bonded with the liquid crystal display panel via an ultraviolet curable or heat curable adhesive, as described in patent document 1, for example. In this case, the patent document 1 discloses that to prevent bubbles from remaining, a high viscosity adhesive having a viscosity from 10,000 to 100,000 cP (1 cP=1 mPa·s) is formed on the periphery, and a low viscosity adhesive having a viscosity from 100 to 1,000 cP is coated inside it, whereby the bonding is made under vacuum (reduced pressure), so that bubbles can be extinguished by returning them to the atmospheric pressure even if small bubbles having a diameter of about 1 mm are entrained. And the viscosity at which bubbles are unlikely to be entrained is from 100 to 1,000 cP as described in the patent document 1.

Besides, regarding the technique for preventing bubbles from remaining, there are patent document 2 and patent document 3, for example. As described in the patent document 2, the heat curable adhesive and bubbles are arranged like a pattern, and heated to a first heating temperature at which the adhesive is not curable, and reduced in pressure (vacuum) to dissolve the bubbles, and thereafter cured at a second heating temperature by applying pressure. At this time, the patent document 2 discloses that the adhesive is made in dots or intersecting stripes (like a lattice), the viscosity of adhesive when coated is 1000 cp or more, and the viscosity of adhesive when heated at the first heating temperature is 100 cp or less.

Also, the patent document 3 discloses that when the bonding is made under vacuum so that bubbles may not remain, an ultraviolet curable adhesive resin for tentative fixing is disposed at the corner, and a heat curable adhesive resin for sealing is made like a line or point.

[Patent document 1] JP-A-10-254380
[Patent document 2] JP-A-2006-36865
[Patent document 3] JP-A-2005-243413

SUMMARY OF THE INVENTION

However, in a structure as shown in FIG. 11, since the air layer is interposed in a portion of the space SP, the visibility may be decreased due to a surface reflection caused by a difference in the refractive index between the air layer and the transparent substrate COV or the like.

Also, with the technique as described in the patent document 1, since the viscosity of the low viscosity adhesive is low, it is required to provide a high viscosity adhesive on the periphery. Accordingly, a coating process becomes complex. Further, there occurs a step with the high viscosity adhesive unless the height of the low viscosity adhesive is adjusted at high precision, possibly producing rather large bubbles.

Also, with the technique as described in the patent document 2, when the viscosity is decreased at the first heating temperature where the heat curable adhesive is not cured, the substrates bonded together may be possibly deviated. Further, when the temperature is increased to the second heating temperature, the heat resistance temperature of the display panel may be surpassed.

Also, with the technique as described in the patent document 3, there is no description for the size or viscosity when the heat curable adhesive resin for sealing is made like a line or point, in which if there is a great separation between adjacent adhesive resins for sealing, large bubbles may be possibly entrained. Also, the heat resistance temperature of the display panel may be surpassed due to the heat curable type.

The foregoing and other objects and features will be apparent from the description of the overall specification and the accompanying drawings.

With the manufacturing method of the liquid crystal display according to the invention, when the display panel and the transparent substrate are bonded via the adhesive in the reduced pressure atmosphere, the bubbles are prevented from remaining by devising one or more of the viscosity of adhesive, the coating pattern, the size of bubble in bonding, and the curing method.

The invention has the following constitutions, for example.

(1) A manufacturing method of a display device in which a transparent substrate is bonded with a display panel via an adhesive, including, a coating step of coating the adhesive onto the display panel or the transparent substrate in a predetermined pattern, a bonding step of bonding the display panel and the transparent substrate via the adhesive after the coating step, and a curing step of curing the adhesive after the bonding step, characterized in that the adhesive has a viscosity of 2000 to 5000 mPa·s at the coating step, the display panel and the transparent substrate are bonded via the adhesive in a reduced pressure atmosphere lower than the atmospheric pressure in a state where the adhesive coated at the coating step is spread and the size of bubble is 1 mm or less at maximum at the bonding step, and the adhesive is cured by applying ultraviolet ray at the curing step.

(2) The manufacturing method of the display device according to (1), characterized in that the adhesive has a viscosity of 2000 to 3000 mPa·s.

(3) The manufacturing method of the display device according to (2), characterized in that the adhesive is coated using a dispenser.

(4) The manufacturing method of the display device according to (1), characterized in that the adhesive has a viscosity of 3000 to 5000 mPa·s.

(5) The manufacturing method of the display device according to (4), characterized in that the adhesive is coated using a screen printing.

(6) The manufacturing method of the display device according to (1), characterized in that the adhesive is coated using an ink jet.

(7) The manufacturing method of the display device according to any one of (1) to (6), characterized in that the predetermined pattern of the adhesive has a lattice pattern with a pitch of 1.5 mm or less.

(8) The manufacturing method of the display device according to any one of (1) to (6), characterized in that the predetermined pattern of the adhesive has a plurality of dot patterns.

(9) The manufacturing method of the display device according to any one of (1) to (8), characterized in that the degree of vacuum is from 1 to 50 Torr at the bonding step.

(10) The manufacturing method of the display device according to any one of (1) to (9), characterized in that the display panel and the transparent substrate are bonded via the adhesive in a state where the size of the bubble is 0.5 mm or less at maximum at the bonding step.

(11) The manufacturing method of the display device according to any one of (1) to (10), characterized in that the display panel and the transparent substrate are bonded via the adhesive while the display panel is bent to be convex on the side of bonding face at the bonding step.

(12) The manufacturing method of the display device according to (11), characterized in that the display panel has a first substrate and a second substrate opposed to the first substrate, and the total of the thickness of the first substrate and the thickness of the second substrate is 0.6 mm or less.

(13) The manufacturing method of the display device according to any one of (1) to (12), characterized in that the adhesive is cured using both heat and the ultraviolet ray at the curing step.

(14) The manufacturing method of the display device according to (13), characterized in that the transparent substrate has partially a light shield portion.

(15) The manufacturing method of the display device according to (13) or (14), characterized in that the heat is from 50 to 80° C.

(16) The manufacturing method of the display device according to any one of (1) to (15), characterized in that the transparent substrate contains one or both of glass and acrylic resin.

(17) The manufacturing method of the display device according to any one of (1) to (16), characterized in that the adhesive contains acrylic resin or epoxy resin.

(18) The manufacturing method of the display device according to any one of (1) to (17), characterized in that the display panel and the transparent substrate are positioned and secured by a jig in a state where the display panel and the transparent substrate are bonded at the bonding step and the curing step.

(19) The manufacturing method of the display device according to any one of (1) to (18), characterized in that the elastic modulus of the adhesive after curing is from 1,000 to 100,000 Pa at 25° C.

(20) The manufacturing method of the display device according to any one of (1) to (19), characterized in that the display panel is a liquid crystal display panel.

The above constitution is only illustrative, and the invention may be appropriately varied within the scope without departing from the technical idea. Also, the other constitution examples of the invention will be apparent from the description of the overall specification and the accompanying drawings.

The representative effect of the invention is as follows.

When the transparent substrate is bonded with the display panel via the adhesive, the bubbles can be prevented from remaining.

The other effects of the invention will be apparent from the description of the overall specification.

DESCRIPTION OF THE PREFERRED EMBODIMENTS

Figure 1:
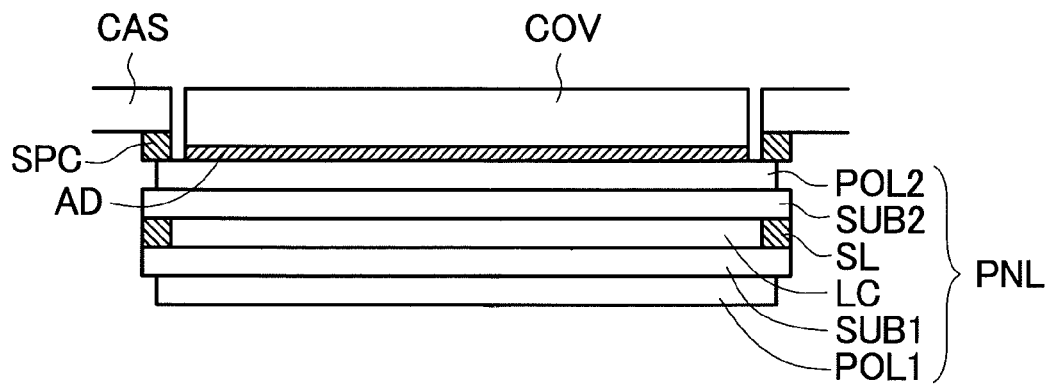
FIG. 1 is a cross-sectional view for explaining one example of a display device according to an embodiment 1 of the present invention.

The embodiments of the present invention will be described below with reference to the drawings. Throughout the drawings and the embodiments, the same or like parts are designated by the same reference numerals, and the explanation thereof is omitted.

Embodiment 1

FIG. 1 is a cross-sectional view for explaining one example of a display device according to an embodiment 1 of the invention. In the embodiment 1, a liquid crystal display is used for a display panel PNL. In FIG. 1, the display panel PNL such as a liquid crystal display panel is incorporated into a casing CAS for a portable telephone or the like. The display panel PNL has a substrate SUB1 that is a translucent insulating substrate made of glass or the like, a substrate SUB2 that is a translucent insulating substrate made of glass or the like, a sealing material SL for bonding the substrate SUB1 and the substrate SUB2, a liquid crystal LC sealed into the inside surrounded by the substrate SUB1, the substrate SUB2 and the sealing material SL, a polarizer POL1 disposed on the side of the substrate SUB1 opposite to the liquid crystal LC, and a polarizer POL2 disposed on the side of the substrate SUB2 opposite to the liquid crystal LC. Also, a thin film transistor and a pixel electrode, not shown, are formed like a matrix on the liquid crystal LC side of the substrate SUB1, often called a TFT substrate. A color filter and a counter electrode, not shown, are formed on the liquid crystal LC side of the substrate SUB2, often called a counter substrate. Also, a retardation film or the like may be disposed at least one of between the substrate SUB1 and the polarizer POL1, and between the substrate SUB2 and the polarizer POL2. Since this invention is not particularly limited to the constitution of the display panel PNL, the other constitutions may be taken.

And a transparent substrate (protection cover) COV made of glass or acrylic (PMMA), for example, is bonded via an adhesive AD with the display panel PNL. In an example of FIG. 1, the transparent substrate COV is bonded with the polarizer POL2, however, the invention is not limited to it. And the display panel PNL, with which the transparent substrate COV is bonded, is disposed to overlap an opening portion provided in the casing CAS. In the example of FIG. 1, the transparent substrate COV is inserted into the opening portion of the casing CAS. Herein, if the materials having almost same refractive indexes are employed as the materials of the transparent substrate COV, the adhesive AD and the polarizer POL2, the surface reflection can be suppressed, whereby the lower visibility can be suppressed. In particular, since glass and acrylic resin have the almost same refractive indexes, it is desirable to use these materials. Besides this combination, the materials in which a refractive index difference between two materials is 0.1 or less may be used. Of course, the materials with the refractive index difference of 0.1 or more may be used as far as the surface reflection is in the permissible range.

A spacer SPC is disposed between the display panel PNL and the casing CAS. If the spacer SPC is provided with viscosity or adhesiveness, the fixation is allowed. Also, an elastic material may be used for the spacer SPC. Further, if the spacer SPC is formed of a waterproof material such as silicon rubber like a frame, for example, water can be prevented from entering through the opening portion of the casing CAS.

Figure 2A:
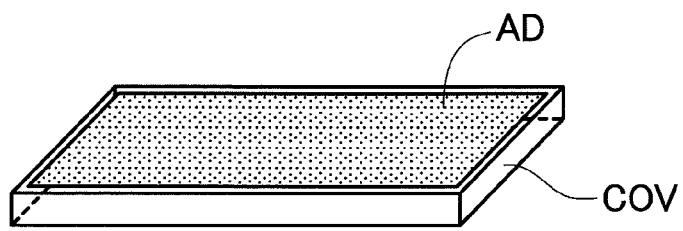
FIGS. 2A to 2C are perspective views for explaining one example of a manufacturing method of the display device according to the embodiment 1 of the invention.
Figure 2B:
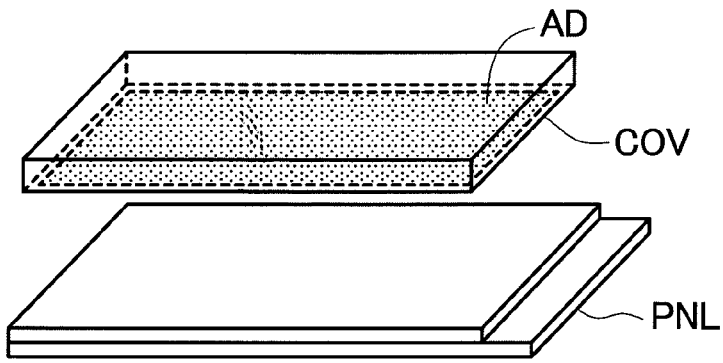
Figure 2C:
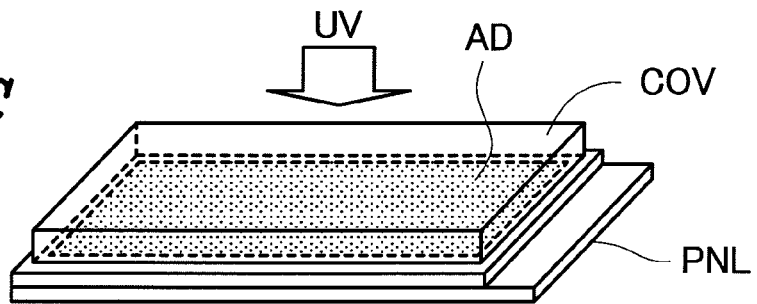

FIGS. 2A to 2C are perspective views for explaining one example of a manufacturing method of the display device according to the embodiment 1 of the invention. First of all, the adhesive AD is coated on the transparent substrate COV, as shown in FIG. 2A. At this time, as will be described later, it is desirable that the adhesive AD is coated in a predetermined pattern. Also, it is desirable that the adhesive AD is coated except for the periphery of the transparent substrate COV, because the adhesive AD is prevented from overflowing the transparent substrate COV to spill out. And left away for a while in this state, the adhesive is spread so that the bubbles are reduced in size.

Next, the transparent substrate COV is turned over, as needed, as shown in FIG. 2B. And in a reduced pressure atmosphere lower than the atmospheric pressure, for example, at a degree of vacuum from 1 to 50 Torr, desirably, from 5 to 10 Torr, the display panel PNL and the transparent substrate COV are bonded via the adhesive AD. At this time, the adhesive AD has a viscosity from 2000 to 5000 mPa·s before curing, whereby the adhesive AD coated at the coating step is spread, so that the size of bubbles becomes 1 mm or less at maximum, more preferably 0.5 mm or less. If the bonding is made in this state, the bubbles in vacuum are diffused after bonding, being inconspicuous, whereby bubbles can be prevented from remaining.

If the viscosity of the adhesive AD is lower than 2000 mPa·s, the coated adhesive AD overflows the transparent substrate COV to spill out. Or when the transparent substrate COV is turned over, it drips down. Also, if the viscosity of the adhesive AD is higher than 5000 mPa·s, the adhesive AD is unlikely to spread, so that bubbles are likely to remain.

Also, when a dispenser is used to coat the adhesive AD, it is desirable that the viscosity is from 2000 to 3000 mPa·s. When a screen printing is used, it is desirable that the viscosity is from 3000 to 5000 mPa·s. When an ink jet is used, it is desirable that the viscosity is from 2000 to 5000 mPa·s.

And it is desirable that the adhesive AD contains acrylic resin or epoxy resin, but other materials such as silicone resin may be used. Also, a mixed material such as epoxy acrylate may be used.

The timing when the system is placed under reduced pressure atmosphere is desirably before coating the adhesive AD, but alternatively may be at least at the bonding time.

Next, the ultraviolet curable adhesive AD is cured under UV irradiation (ultraviolet irradiation) in the bonded state, as shown in FIG. 2C. Since the ultraviolet curable adhesive AD is used, it can be cured without worrying about the heat resistance temperature of the display panel PNL through the heat process. The bubbles may be examined before UV irradiation, as needed, and it is left away for a while until the bubbles disappear. In the bonded state, the adhesive AD can be spread up to the end part of the transparent substrate COV, depending on the viscosity or coated amount of the adhesive AD, as shown in FIG. 2C.

Herein, since the viscosity of the adhesive AD before curing is not very high, it is desirable that the display panel PNL and the transparent substrate COV are positioned and secured by a jig, not shown, in a state where the display panel PNL and the transparent substrate COV are bonded at the bonding step and the curing step, until the curing is ended.

It is desirable that the modulus of elasticity of the adhesive AD after curing is from 1,000 to 100,000 Pa at room temperature (25° C.). Thereby, even when the materials having different thermal expansion ratios are bonded, the stress can be relieved by the adhesive AD. The modulus of elasticity of the adhesive AD after curing can be measured by a Thermo Mechanical Analysis (TMA).

Figure 3:
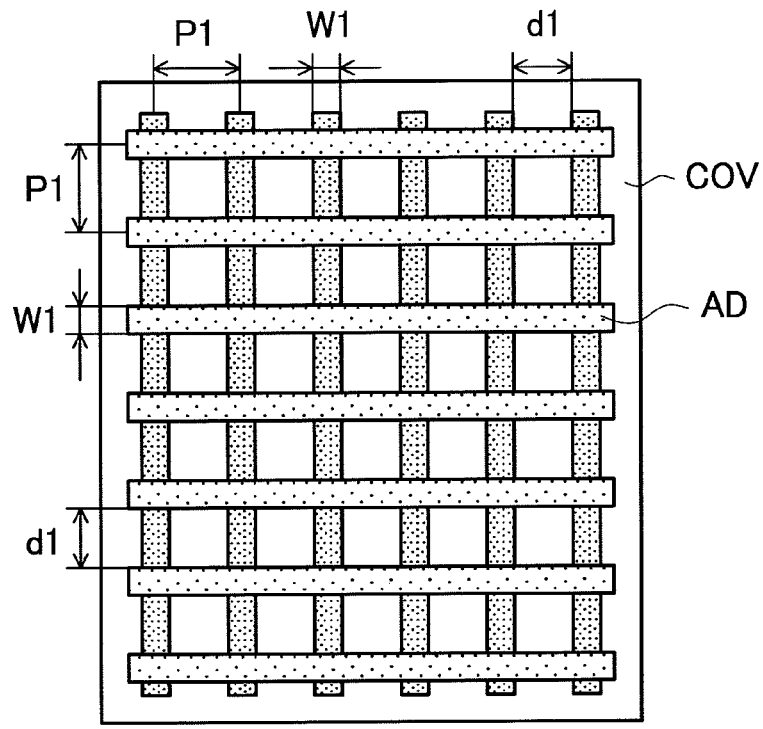
FIG. 3 is a plan view for explaining one example of a pattern of coating the adhesive.
Figure 4:
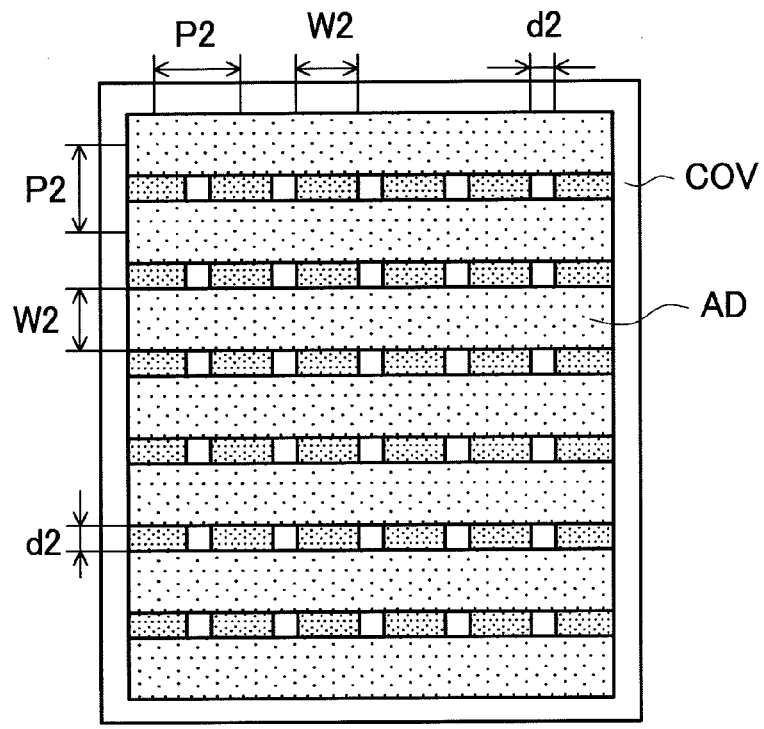
FIG. 4 is a plan view for explaining how the adhesive coated in the pattern of FIG. 3 is spread.

The examples of the pattern of coating the adhesive AD will be described below. FIG. 3 is a plan view for explaining one example of the pattern of coating the adhesive. FIG. 4 is a plan view for explaining how the adhesive coated in the pattern of FIG. 3 is spread. In the example of FIG. 3, the adhesive AD is coated in the lattice-like pattern. Herein, it is desirable that the pitch P1 of the adhesive AD is from 0.5 mm to 1.5 mm. It is desirable that the width W1 of the adhesive AD is from 0.2 mm to 1 mm. At this stage, the size d1 of bubble may exceed 1 mm. After a while, the adhesive AD is spread, so that width W2>W1, as shown in FIG. 4. The pitch P2 is equal to the pitch P1. The size d2 of bubble is smaller than the size d1 of bubble directly after coating.

It is important here that the adhesive AD is not coated uniformly flat, but coated in the pattern with which fine bubbles remain. Further, since each bubble is divided, the size d2 of each bubble is smaller. When the adhesive AD is uniformly flat, or when the uncoated area (bubble) is large, large bubbles may be possibly entrained, but by bonding with divided small bubbles left behind, the possibility that large bubbles are entrained at the time of bonding can be reduced. Accordingly, even after bonding, the size of bubbles in vacuum can be suppressed to the extent that the bubbles in vacuum are diffused to be unnoticeable (e.g., the maximum value of the size of bubbles is 1 mm or less, desirably 0.5 mm or less). The bubbles in vacuum remaining after bonding are diffused to be unnoticeable by the time when the curing of the adhesive AD is ended.

Figure 5:
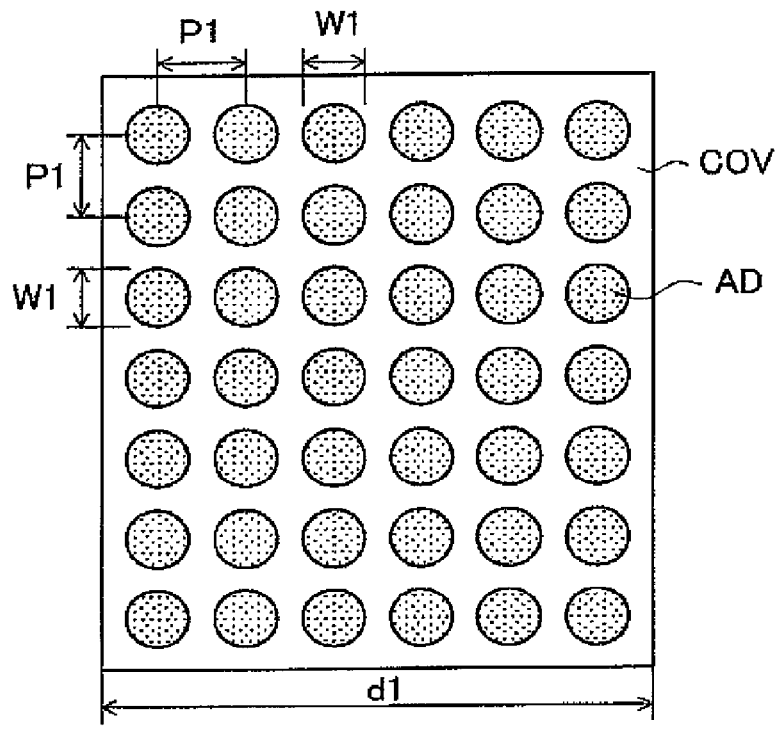
FIG. 5 is a plan view for explaining another example of the pattern of coating the adhesive.
Figure 6:
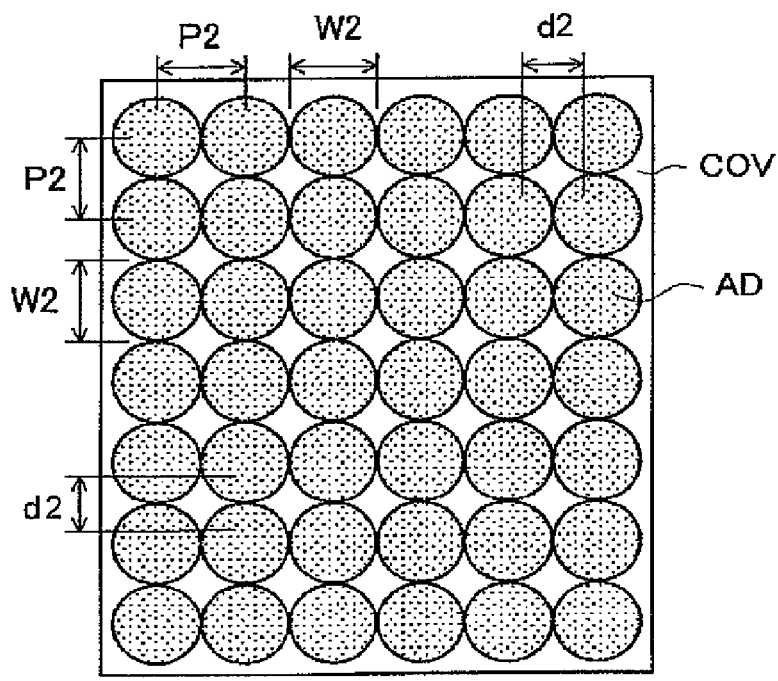
FIG. 6 is a plan view for explaining how the adhesive coated in the pattern of FIG. 5 is spread.

FIG. 5 is a plan view for explaining another example of the pattern of coating the adhesive. FIG. 6 is a plan view for explaining how the adhesive coated in the pattern of FIG. 5 is spread. In the example of FIG. 5, the adhesive AD is coated at the pitch P1 in the dot pattern with the width (diameter) W1. In this case, since respective dots are not connected, the area where there is no adhesive AD is very large, and has the size d1. If these dots are spread, the width W2>W1, so that they are connected with each other, as shown in FIG. 6. Thereby, respective bubbles are divided into the size d2, and become smaller.

The invention is not limited to the patterns as described in FIGS. 3 to 6, but the adhesive AD may be coated in any other pattern. Though the adhesive AD is coated on the side of the transparent substrate COV in the embodiment 1, the adhesive AD may be coated on the side of the display panel PNL.

Embodiment 2

Figure 7:
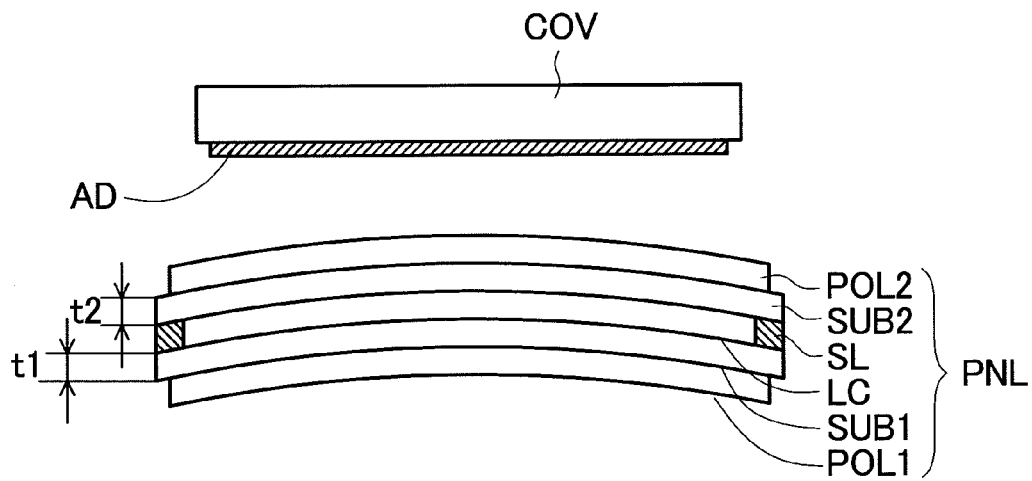
FIG. 7 is a side view for explaining one example of a manufacturing method of a display device according to an embodiment 2 of the invention.

FIG. 7 is a side view for explaining one example of a manufacturing method of a display device according to an embodiment 2 of the invention. When the display panel PNL and the transparent substrate COV are bonded, they are bonded while the display panel PNL is bent to be convex on the side of bonding face, as shown in FIG. 7. Thereby, the possibility that large bubbles are entrained can be reduced. In this case, it is preferable that the total of the thickness t1 of the substrate SUB1 and the thickness t2 of the substrate SUB2 is 0.8 mm or less, more preferably 0.6 mm or less. The lower limit is not particularly limited, but the total is desirably 0.1 mm or more.

Though the display panel PNL is bent in FIG. 7, the transparent substrate COV or both the display panel PNL and the transparent substrate COV may be bent so as to be convex on the side of bonding face during bonding.

Embodiment 3

Figure 8:
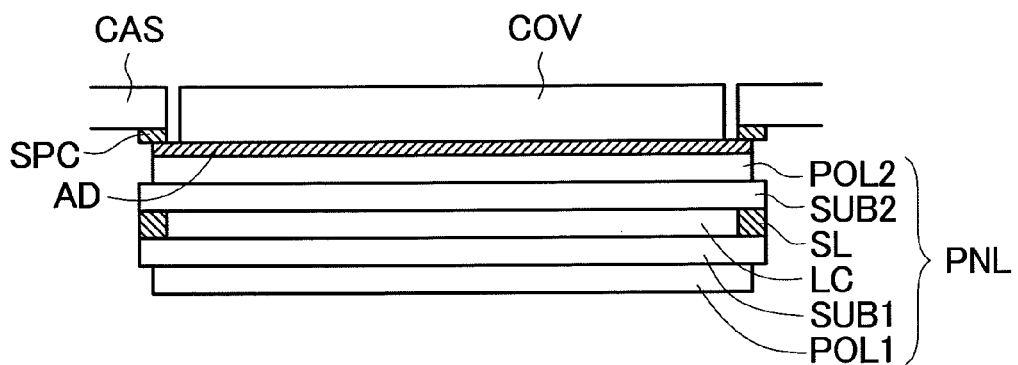
FIG. 8 is a cross-sectional view for explaining one example of a display device according to an embodiment 3 of the invention.

FIG. 8 is a cross-sectional view for explaining one example of a display device according to an embodiment 3 of the invention. A different point from the embodiment 1 of FIG. 1 is that the adhesive AD extends up to the end part of the polarizer POL2. The adhesive AD can be spread outside the end part of the transparent substrate COV, when bonded, by adjusting the viscosity of the adhesive AD, the coating pattern, or the coating amount, for example. Or the adhesive AD may be coated on the side of the display panel PNL.

Embodiment 4

Figure 9:
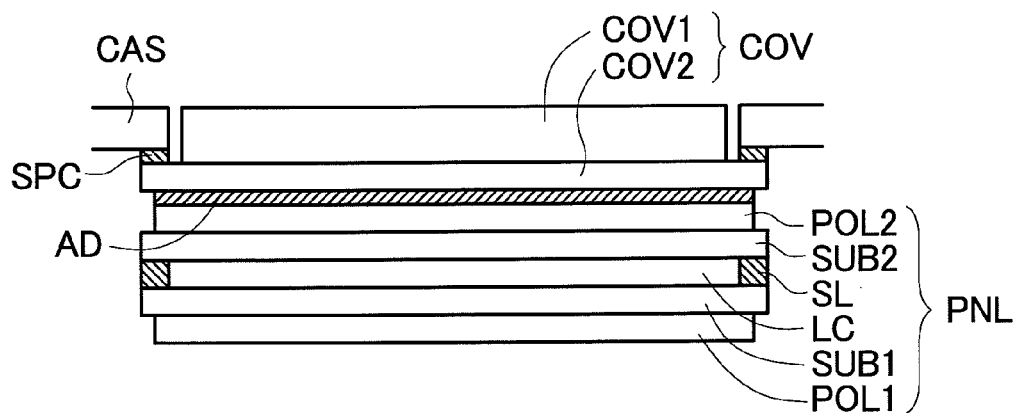
FIG. 9 is a cross-sectional view for explaining one example of a display device according to an embodiment 4 of the invention.

FIG. 9 is a cross-sectional view for explaining one example of a display device according to an embodiment 4 of the invention. A different point from the embodiment 3 of FIG. 8 is that the transparent substrate COV is composed of the transparent substrate COV1 and the transparent substrate COV2. The adhesive, not shown, is provided between the transparent substrate COV1 and the transparent substrate COV2. The transparent substrate COV2 is larger in outside dimension than the transparent substrate COV1. The transparent substrate COV2 is larger in outside dimension than the opening portion of the casing CAS. And a spacer SPC is disposed between the transparent substrate COV2 and the casing CAS. The transparent substrate COV1 is made of glass, for example, and the transparent substrate COV2 is made of acrylic (PMMA), for example. The constitution of the transparent substrate COV as shown in FIG. 9 is only illustrative, and the other constitutions may be employed.

Embodiment 5

Figure 10:
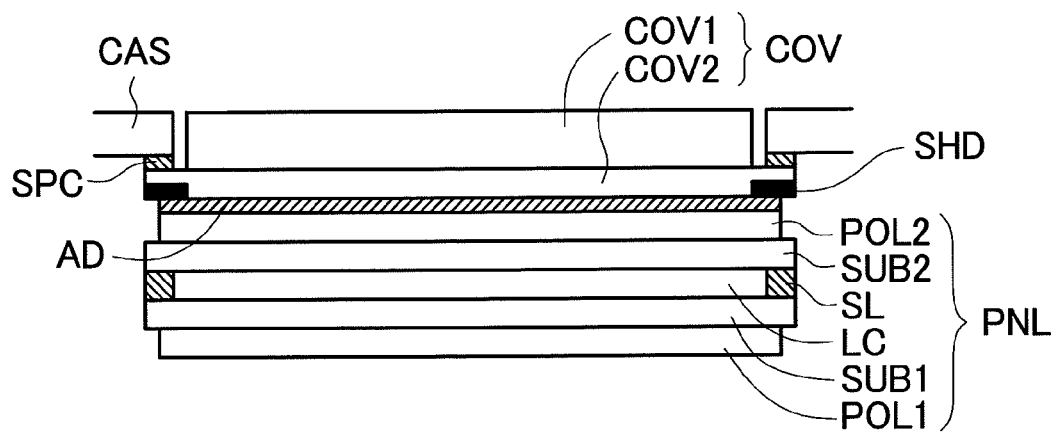
FIG. 10 is a cross-sectional view for explaining one example of a display device according to an embodiment 5 of the invention.
Figure 11:
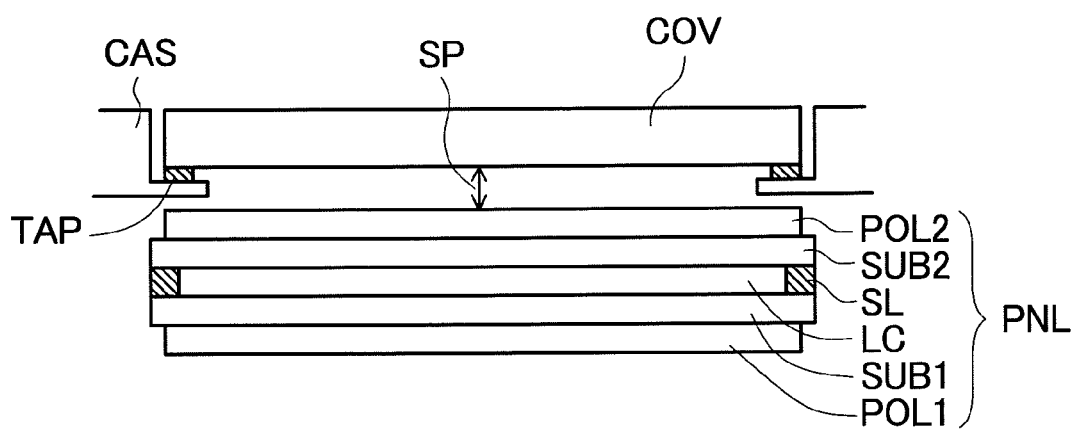
FIG. 11 is a cross-sectional view for explaining the conventional liquid crystal display.

FIG. 10 is a cross-sectional view for explaining one example of a display device according to an embodiment 5 of the invention. A different point from the embodiment 4 of FIG. 9 is that a light shield portion SHD is provided in a part of the transparent substrate COV. For example, the light shield portion SHD is formed like a frame to surround the display area of the display panel PNL.

In this case, since the adhesive AD can not be sufficiently cured by ultraviolet irradiation in an area overlapping the light shield portion SHD, it is desirable that the adhesive AD is cured using both heat and ultraviolet ray. In this case, the temperature is from 50 to 80° C., more preferably from 55 to 70° C., in view of the heat resistance temperature of the display panel PNL. This degree of temperature can be implemented by using a lamp for UV irradiation having a large output (e.g., 150 mW or more). Since it is unnecessary to cure the adhesive AD at 100%, the temperature may be a level that a heat-assist can be performed.

Embodiment 6

The ultraviolet curing with heat assist as described in the embodiment 5 is also applicable to the display device where the transparent substrate COV is not formed with the light shield portion SHD.

Embodiment 7

In the embodiments 1 to 6, instead of the spacer SPC, or together with the spacer SPC, a gap between the casing CAS and the transparent substrate COV may be totally enclosed with a second spacer made of waterproof material such as silicone rubber, not shown. Thereby, the water resistance is assured. Also, the spacer SPC and the second spacer may be integrally provided.

Embodiment 8

The display panel PNL is not limited to the liquid crystal display panel, but the invention may be applicable to the display panel of other type such as an organic electroluminescent display panel.

Though the invention has been described above in connection with the embodiments, the constitution of each embodiment is only illustrative, but the invention may be appropriately modified in various ways without departing from the technical ideas. Also, the constitutions as described in the embodiments may be combined as far as no contradiction arises.

What is claimed is:

1. A manufacturing method of a display device in which a transparent substrate is bonded with a display panel via an adhesive, comprising:

providing an adhesive onto a surface of a display panel or a surface of a transparent substrate, so as to form predetermined pattern on the surface of the display panel or the surface of the transparent substrate, the predetermined pattern having first areas in which the adhesive is provided and second areas in which the adhesive is not provided, the first areas being around each of the second areas, the adhesive having a viscosity of 2000 to 5000 mPa·s;

letting the adhesive in the first areas spread, wherein after letting the adhesive in the first areas spread, the second areas have a size of more than 0 mm and less than 1 mm, bonding the display panel and the transparent substrate via the adhesive at a pressure lower than atmospheric pressure, wherein after bonding, bubbles are present in the second areas, the bubbles having a pressure lower than the atmospheric pressure;

diminishing the bubbles at the atmospheric pressure; and curing the adhesive after the bubbles are diminished.

2. The manufacturing method of the display device according to claim 1, wherein the adhesive has a viscosity of 2000 to 3000 mPa·s.

3. The manufacturing method of the display device according to claim 1, wherein the adhesive has a viscosity of 3000 to 5000 mPa·s.

4. The manufacturing method of the display device according to claim 1, wherein the adhesive is provided by coating using an ink jet.

5. The manufacturing method of the display device according to claim 1, wherein the predetermined pattern of the adhesive has a plurality of dot patterns.

6. The manufacturing method of the display device according to claim 1, wherein a degree of vacuum is from 1 to 50 Torr during the bonding.

7. The manufacturing method of the display device according to claim 1, wherein the display panel and the transparent substrate are bonded via the adhesive in a state where the size of the bubble is 0.5 mm or less at maximum during the bonding.

8. The manufacturing method of the display device according to claim 1, wherein the display panel and the transparent substrate are bonded via the adhesive while the display panel is bent to be convex on the side of bonding face during the bonding.

9. The manufacturing method of the display device according to claim 1, wherein the adhesive is cured using both heat and the ultraviolet ray the curing.

10. The manufacturing method of the display device according to claim 1, wherein the transparent substrate contains one or both of glass and acrylic resin.

11. The manufacturing method of the display device according to claim 1, wherein the adhesive contains acrylic resin or epoxy resin.

12. The manufacturing method of the display device according to claim 1, wherein the display panel and the transparent substrate are positioned and secured by a jig in a state where the display panel and the transparent substrate are bonded during the bonding and the curing.

13. The manufacturing method of the display device according to claim 1, wherein the elastic modulus of the adhesive after the curing is from 1,000 to 100,000 Pa at 25° C.

14. The manufacturing method of the display device according to claim 1, wherein the display panel is a liquid crystal display panel.

15. The manufacturing method of the display device according to claim 1, wherein the coating is performed at a pressure lower than atmospheric pressure, and the pressure lower than atmospheric pressure is maintained during the bonding.

16. The manufacturing method of the display device according to claim 1, wherein providing the adhesive onto the surface of the display panel or the surface of the transparent substrate comprises coating the adhesive onto the surface of the display panel or the surface of the transparent substrate.

17. The manufacturing method of the display device according to claim 1, wherein providing the adhesive onto the surface of the display panel or the surface of the transparent substrate comprises providing the first areas surrounding each of the second areas of the predetermined pattern.

18. The manufacturing method of the display device according to claim 2, wherein the adhesive is provided by coating using a dispenser.

19. The manufacturing method of the display device according to claim 3, wherein the adhesive is provided by coating using a screen printing.

20. The manufacturing method of the display device according to claim 8, wherein the display panel has a first substrate and a second substrate opposed to the first substrate, and the total of the thickness of the first substrate and the thickness of the second substrate is 0.6 mm or less.

21. The manufacturing method of the display device according to claim 9, wherein the transparent substrate has partially a light shield portion.

22. The manufacturing method of the display device according to claim 9, wherein the heat is from 50 to 80° C.

23. The manufacturing method of the display device according to claim 17, wherein the predetermined pattern of the adhesive has a lattice pattern with a pitch of 1.5 mm or less.

* * * * *